United States Patent
Bak et al.

(10) Patent No.: US 8,560,422 B1
(45) Date of Patent: *Oct. 15, 2013

(54) EXCHANGE TRADED PRODUCT SYSTEM AND METHOD

(71) Applicant: Security Investors, LLC, Rockville, MD (US)

(72) Inventors: Phil Bak, Silver Spring, MD (US); Kevin Farragher, Gaithersburg, MD (US)

(73) Assignee: Security Investors, LLC, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,136

(22) Filed: Oct. 8, 2012

Related U.S. Application Data (63) Continuation of application No. 12/569,757, filed on Sep. 29, 2009, now Pat. No. 8,285,621.

(60) Provisional application No. 61/101,006, filed on Sep. 29, 2008.

(51) Int. Cl.
*G06Q 40/00* (2012.01)

(52) U.S. Cl.
USPC ................................................. 705/36 R

(58) Field of Classification Search
USPC ................................................. 705/36 R
See application file for complete search history.

(56) References Cited

U.S. PATENT DOCUMENTS

| | | |
|---|---|---|
| 2002/0138387 A1 | 9/2002 | Griffin |
| 2004/0093307 A2 | 5/2004 | Paglin et al. |
| 2006/0111958 A1 | 5/2006 | Ishimaru et al. |
| 2008/0052212 A1 | 2/2008 | Winsauer |
| 2008/0243718 A1 | 10/2008 | Farhang |
| 2009/0012891 A1 | 1/2009 | Chada et al. |
| 2009/0125438 A1 | 5/2009 | McConaughy et al. |

FOREIGN PATENT DOCUMENTS

CA 2 626 935 * 11/2006

OTHER PUBLICATIONS

Neo et al.: The role of offshore incorporations in asset protections, financial privacy and fund transfers, 1997, pp. 1-6.*
Moore et al.: Indirect ownership of CFC and PFIC shares by U.S. beneficiaries of foreign trusts, Feb. 2008, Journal of Taxation, pp. 1-13.*
Miyoshi, David M: Professional Services-Global, May 2006, Wayback Machine Archive, pp. 1-22.

(Continued)

*Primary Examiner* — Bijendra K Shrestha
(74) *Attorney, Agent, or Firm* — Lathrop & Gage LLP (57) ABSTRACT

A system for managing assets of a trust owning a controlled foreign corporation (CFC). The system includes means for associating the CFC with the trust owning the CFC and means for tracking assets associated with the CFC and the trust owning the CFC. A method for managing assets of a trust owning a CFC includes (1) associating the CFC with the trust owning the CFC using a linking database, (2) tracking assets associated with the CFC and the trust owning the CFC using an asset database, (3) tracking transactions associated with the assets using a transaction database, and (4) determining profit/loss data associated with the transactions using a processor communicatively coupled with the transaction database.

9 Claims, 5 Drawing Sheets

(56) References Cited

OTHER PUBLICATIONS

Neo et al., The role of offshore incorporations in asset protection, financial privacy and fund transfer, (http://pachome1.pacific.net.sg/~chanpal/article10.htm)1997, pp. 1-6.

Jacobs et al.: Controlled foreign Corporation Tax Guide, May 2007, Offshore Press, Inc., pp. 1-187.

Select File History from related U.S. Appl. No. 12/569,757, dated Dec. 21, 2011 through Jun. 6, 2012, 46 pages.

\* cited by examiner

EXCHANGE TRADED PRODUCT SYSTEM AND METHOD

CROSS-REFERENCE TO RELATED APPLICATIONS

This application is a continuation of the U.S. patent application Ser. No. 12/569,757, filed Sep. 29, 2009, which claims benefit of priority to U.S. Provisional Patent Application Ser. No. 61/101,006, filed Sep. 29, 2008. Each of the above mentioned applications is incorporated herein by reference.

BACKGROUND

Exchange Traded Funds (ETFs) are investment vehicles that investors can buy and sell to gain approximate exposure to the net asset value of the underlying index.

A commodity (e.g., pork bellies, rice, wheat, aluminum) defines a good for which there is demand but which is not readily differentiated across the marketplace. Certain companies track commodity prices; for example the Goldman Sachs Commodity Index (GSCI) is an investment performance benchmark tracking global commodities, weighted by liquidity and global production levels. Commodities thus also indicate marketplace economics.

Many companies invest in commodities to function and manage unknown price fluctuations. These companies thus often employ the derivatives market to hedge fluctuations in commodities prices using futures contracts ("futures"). Variable prices may also be traded for fixed prices, and vice versa, in commodity "swaps". A commodity swap is exceptionally useful in hedging against price risks by exchanging cash flows without physical delivery of the commodities. In operation, companies that use commodities agree to a fixed price with a counterparty for a pre-agreed period. At the settlement date, if the market price is lower than the agreed-to price, the company pays the counterparty the difference; if the market price is higher, the company receives the difference from the counterparty.

Investors also invest in commodities to capitalize on price movements. A common way for these investors to invest in (a) commodities is to invest in securities of companies which own or process commodities, (b) invest in Futures, Options or ETFs that track commodities, commodity performance, or commodity indices (e.g., GSCI), or c) invest in mutual funds which invest in commodities or related securities.

The character of income derived from commodity instruments such as futures or swaps, when packaged in a partnership, commonly results in capital gains or income reported in a "K-1". A K-1 is used in partnerships, LLCs and sub-chapter S corporations and refers to the Internal Revenue Service (IRS) form used to report an owner's share of income and expense items. A K-1 adds complexity to tax reporting and can greatly increase the cost of investment due to calculation and reporting requirements associated with the K-1.

SUMMARY

The disclosed subject matter uses Exchange Traded Products (ETPs). ETPs are similar to ETFs and include ETFs as well as other non-Investment Company Act of 1940 securities. The exchange-traded product (ETP) systems and methods disclosed provide for investing in commodity instruments (futures, swaps, treasuries tied to commodity indices (indexes) or sub-indices (sub-indexes)) correlated to a commodity index. The structure of the ETP listed below is done so that the investment in the commodity instruments results in ordinary income distributions which are conveniently reported on an IRS form 1099 (many businesses file thousands of 1099s each year in cooperation with the filing of a single tax return).

According to the systems and methods herein, a trust (or a series trust) is established as the sole owner of a controlled foreign corporation ("CFC", e.g., a Cayman Island segregated portfolio company), with "foreign" defined as outside or located outside of the United States, its territories and possessions, collectively "United States", and not subject to the tax laws of the United States but rather those of the sovereign nation in which the CFC is registered. "Foreign" and "offshore" are used interchangeably herein when referring to CFCs.

The CFC engages or invests in all the commodity instruments. Since the CFC is wholly owned by the trust, income is ordinary according to IRS statutes and reported to the investors/shareholders via a 1099. Through the systems and methods herein, investors, through purchasing shares over an exchange issued by authorized participants, invest in the CFC through exchange traded products (ETPs) owning units (stock of a corporation) of the CFC, thereby gaining exposure to commodity indices (and sub-indices) while maintaining ordinary tax treatment.

If the CFC was instead an entity taxed as a partnership, inside the United States, the IRS would equate the ETFs with the CFC, triggering a K-1. This is avoided by the systems and methods herein disclosed.

Investors may buy and sell the shares of the ETPs in market transactions, but institutional investors may redeem large blocks of shares of the ETPs as "creation units" for a "basket" of the underlying assets or, alternatively, exchange the underlying assets for creation units. This creation and redemption of the ETPs enables institutions to engage in arbitrage that causes the value of the ETPs to approximate the net asset value of the underlying commodities.

An embodiment of the disclosed subject matter is directed to an exchange traded product system. The system includes, at least one controlled foreign corporation, at least one trust that owns the CFC, and at least one exchange traded product defining the at least one trust, with the at least one ETP tracking a commodity index. As a result of this structure for the system, trades, for example, buying and selling of investment instruments, made on behalf of the CFC, within the at least one trust, result in ordinary income, for example, 1099 income, to investors.

Another embodiment of the disclosed subject matter is directed to an exchange traded product method. The method includes, forming a controlled foreign corporation, forming a trust to own the CFC and forming an exchange traded product to define the trust, with the ETP generally tracking a commodity index, that can be monitored electronically by at least one computer over a network. Trades, for example, buying and selling of investment instruments, on behalf of the CFC, will result in ordinary income, for example, 1099 income, being provided to investors.

Another embodiment of the disclosed subject matter is directed to a system for managing assets of a trust owning a CFC. The system includes means for associating the CFC with the trust owning the CFC and means for tracking assets associated with the CFC and the trust owning the CFC.

Another embodiment of the disclosed subject matter is directed to a method for managing assets of a trust owning a CFC, including (1) associating the CFC with the trust owning the CFC using a linking database, (2) tracking assets associated with the CFC and the trust owning the CFC using an asset database, (3) tracking transactions associated with the assets using a transaction database, and (4) determining profit/loss data associated with the transactions using a processor communicatively coupled with the transaction database.

Yet another embodiment of the disclosed subject matter is directed to an exchange traded product system including at least one controlled foreign corporation (CFC), at least one trust that owns the CFC, and at least one exchange traded product (ETP) defining the at least one trust. A processor conducts trades on behalf of the at least one CFC within the trust so that the at least one ETP tracks a commodity index. The trades result in ordinary income to investors investing in the CFC.

BRIEF DESCRIPTION OF THE DRAWINGS

Attention is now directed to the drawings, where like numerals or characters indicate corresponding or like components. In the drawings.

DETAILED DESCRIPTION

Figure 1:
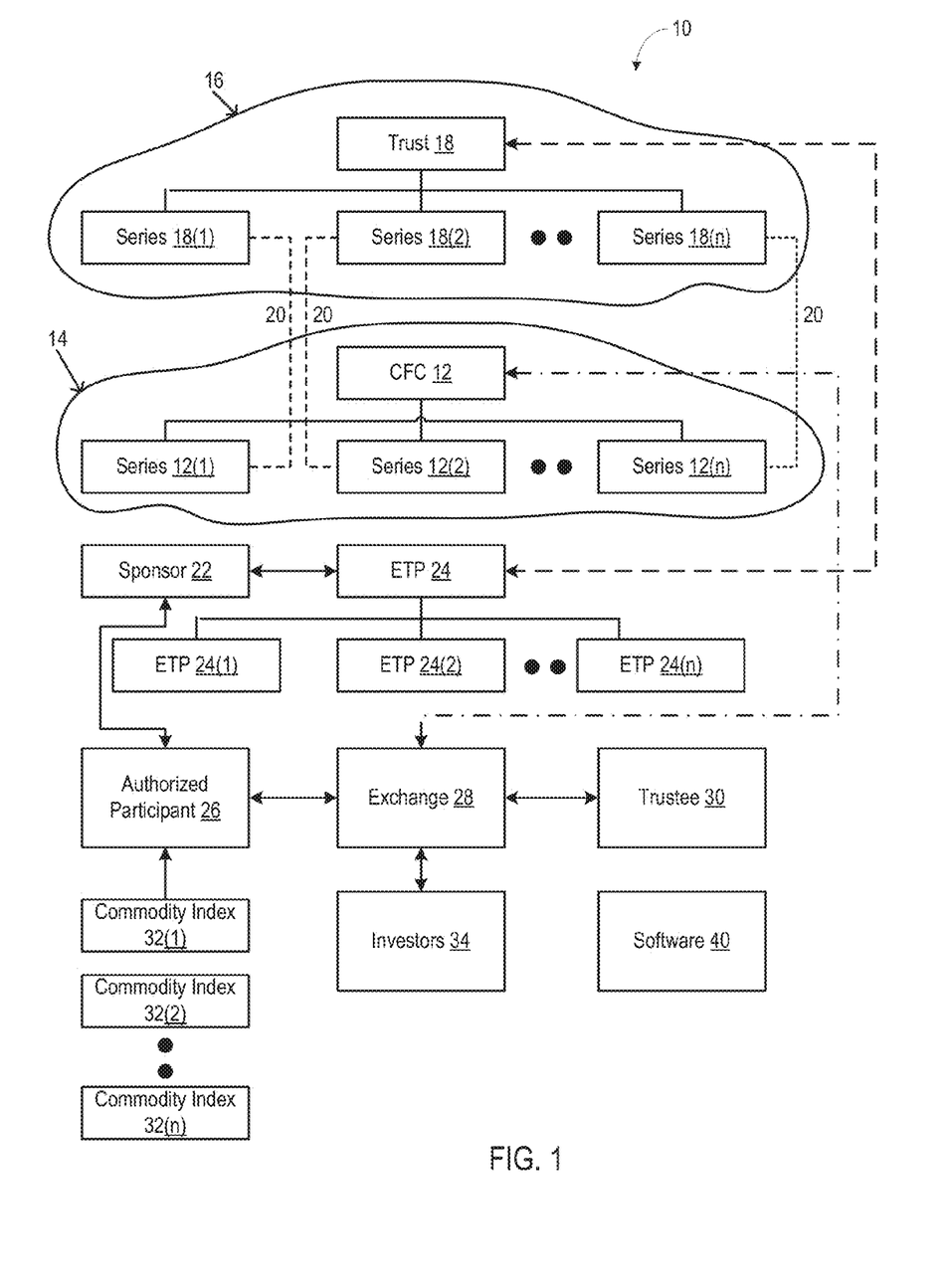
FIG. 1 is a diagram of the system of the disclosed subject matter.
Figure 2:
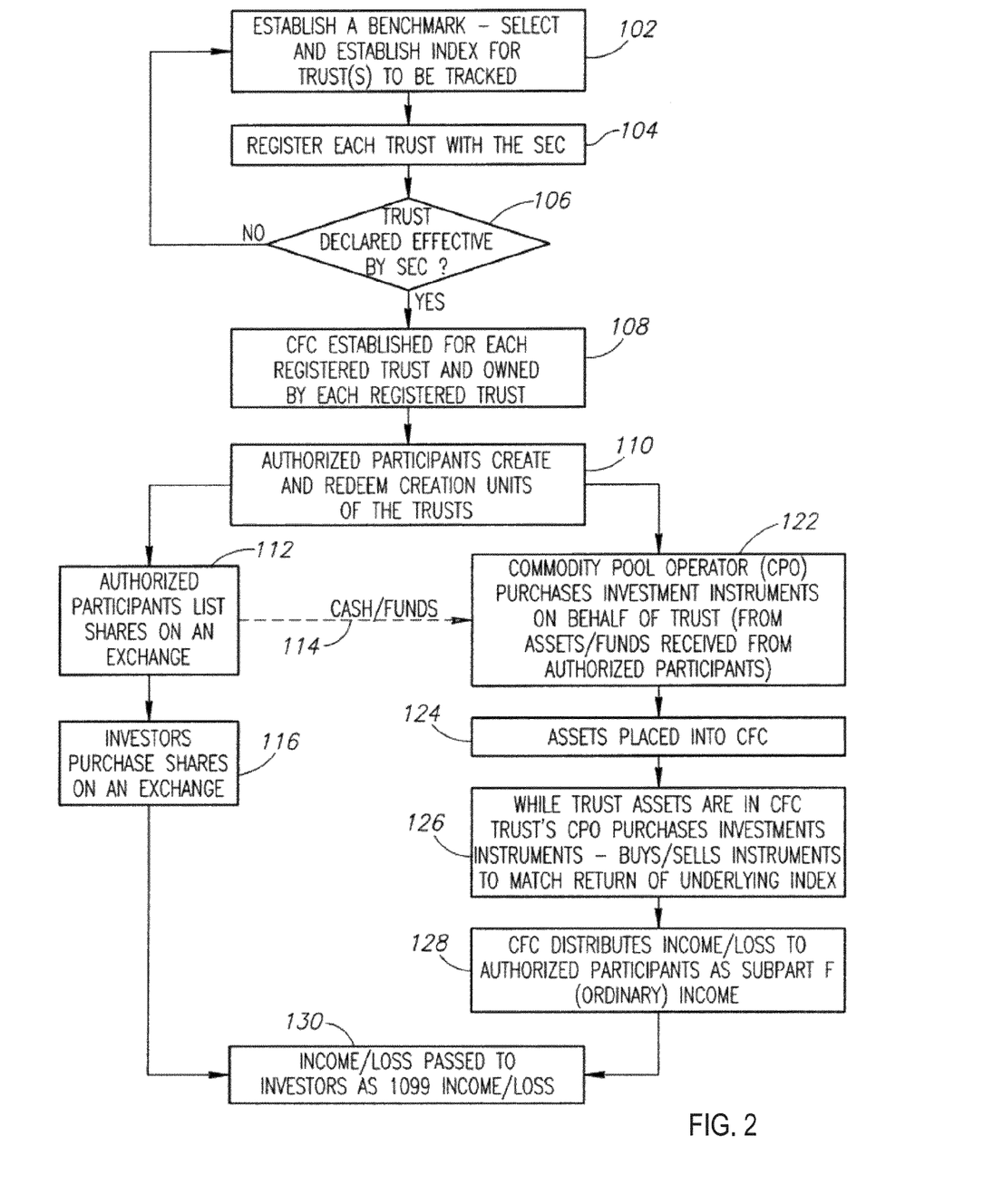
FIG. 2 is a flow diagram of the disclosed system.

FIG. 1 shows an exchange traded product system 10. FIG. 2 shows a flow diagram of a process that accompanies the system of FIG. 1, with its processes indicated by blocks with numbers in the "100s". System 10 has a controlled foreign corporation (CFC) 12 located off-shore 14 (e.g., outside of) the United States 16, and a corresponding trust 18 located inside the United States, as shown (CFC 12 may include a series of CFCs 12(1) . . . 12(n) and trust 18 may include a series of trusts 18(1) . . . 18(n), as shown; trust 18(1) corresponds 20 with CFC 12(1), trust 18(2) corresponds 20 with CFC 12(2) and so on.

A fund sponsor 22 originates an exchange traded product (ETP) 24 to a trust 18 that owns a corresponding CFC 12. As shown, a series of ETPs 24(1) . . . 24(n) corresponding to trusts 18(1) . . . 18(n) may instead be formed to own CFC 12(1) . . . 12(n). Sponsor 22 chooses the ETP's target index, determines which securities will be included in the "basket" of securities (block 102), and decides how many shares of ETP 24 will be offered to investors 34. Each trust 18(1)-18(n) is registered with the Securities and Exchange Commission (SEC), at block 104, and the SEC determined if the trust is effective, at block 106. If the trust is not declared effective, the process returns to block 102. The aforementioned CFC 12(1)-12(n) is established for each corresponding trust 18(1)-18(n) and is owned by each respective trust 18(1)-18(n), at block 108.

The trust 18 and subtrusts 18(1)-18(n) are a first tier trust that serves as a holding company. The CFC 12 and sub CFCs 12(1)-12(n), owned by the corresponding subtrusts 18(1)-18(n), are second tier trusts that manage the assets of the first tier trusts, offshore, allowing for subpart F and 1099 treatment of income/loss from the resultant assets, as detailed below.

The sponsor 22 also selects an Authorized Participant (AP) 26 to act as the Lead Market Maker, to take responsibility for obtaining the underlying initial securities needed to create the requisite ETP 24, by a process commonly known as seeding. Authorized participant 26 is, for example, a large institutional organization (or broker or banking entity), such as a market maker or specialist, for a trading exchange 28 (e.g., NASDAQ, which has over 500 market makers). The authorized participant 26 for example constructs creation units (large blocks of ETP 24 underlying shares of commodities or commodity instruments) of the trusts, at block 110 and deposits the securities with the ETP 24, as the requisite trust 18(1)-18(n). The authorized participant 26 lists shares on an exchange, at block 112, and the cash from the sale of the shares is used to acquire investment instruments on behalf of the requisite trust, arrow 114 from block 112 to block 122.

After acquiring all the underlying securities that form ETP 24, the authorized participant 26 transfers the shares to a trustee 30 (e.g., a bank such as State Street Bank & Trust, Boston). The trustee may be, for example, a commodity pool operator (CPO) that purchases investment instruments on behalf of the requisite trust, at block 122. Thereafter, authorized participant 26 exploits price differences between sell and buy orders of ETP 24.

Authorized participant 26 provides sponsor 22 with a basket of commodity instruments composed upon one or more commodity indices 32(1) . . . 32(n) (mirroring trust series 18, i.e., one index per trust) upon which the ETP 24 is based. In one embodiment, index 32(1) is two times the daily result of GSCI (or sub-indices), index 32(2) is two times the inverse of GSCI (or sub-indices).

Through exchange 28, investors 34 invest in trust 18 using ETP 24 and trust 18 then invests in CFC 12 (the assets are placed into the CFC at block 124). The invested amount provides a proportional interest in and to trust 18 (i.e., subtrusts 18(1)-18(n)), and in turn CFC 12. Accordingly, ETP 24 provides exposure in commodity index (or indices) 32. For example, while the trust assets are in the CFC, the CPO of the trust purchases investment instruments, that may be done by purchasing and selling instruments to match returns of the requisite underlying index, such as the GSCI® Index, at block 126.

Investors 34 and authorized participant 26 have this exposure without taking physical control of the underlying commodities (this exposure is, for example, in the form of commodities futures of commodity index swaps). Upon receipt of cash, authorized participant 26 obtains securities (ETPs 24) that are sold in the securities market through exchange 28, providing access to investors 34 (at block 116). Also, the CFC distributes income/loss to the authorized participant 26 as Subpart F or Ordinary income, at block 128. The income/loss is passed to the investors as 1099 income/loss, at block 130.

Through exchange traded product system 10, investors 34 thus buy into an investment philosophy that provides for select model diversification in commodity indices. CFC 12 provides efficiency since tax reporting is based on calculations per share provided by trustee 30. System 10 may be an especially efficient way to organize multiple commodity exposures through a single filing as disclosed in Appendix A of the '006 patent application.

Detailed Tax Discussion

The following describes U.S. tax considerations related to system 10 using exchanged-traded commodities investment funds. The structure of system 10 for example involves a Delaware statutory series trust whose units/interests are publicly traded. Units are issued in several different series of the trust, each of which will attempt to track a different specified commodities benchmark. The assets of each series will consist of stock in a foreign corporation (CFC 12), possibly organized in the Cayman Islands (each trust in the series owns shares in a different CFC or possibly in a different cell of a single "protected cell" or "segregated accounts" company). Investors 34 purchase units in a particular series (ETP 24), which in turn will invest in shares in CFC 12. CFC 12 then enters into commodities contracts with U.S. counterparties, using its capital to provide margin for the commodities contracts and to purchase Treasuries and other fixed-income securities. CFC 12 is for example managed by Investment personnel in the United States (System 200 in FIG. 3), who will attempt to track the specified benchmark through futures, forwards, swaps and other transactions in commodities.

The form of these transactions is to be respected so that each ETP 24 and its corresponding CFC 12 are not to be collapsed into a single entity. Since ETP 24 is (under tax law) a CFC 12, trust 18 will be treated as the sole "U.S. shareholder" of a Foreign Corporation under the tax laws. Holders of trust units will be required to report their allocable shares of the income, (including subpart F income), gains, losses and deductions realized by the trust.

Software

Figure 3:
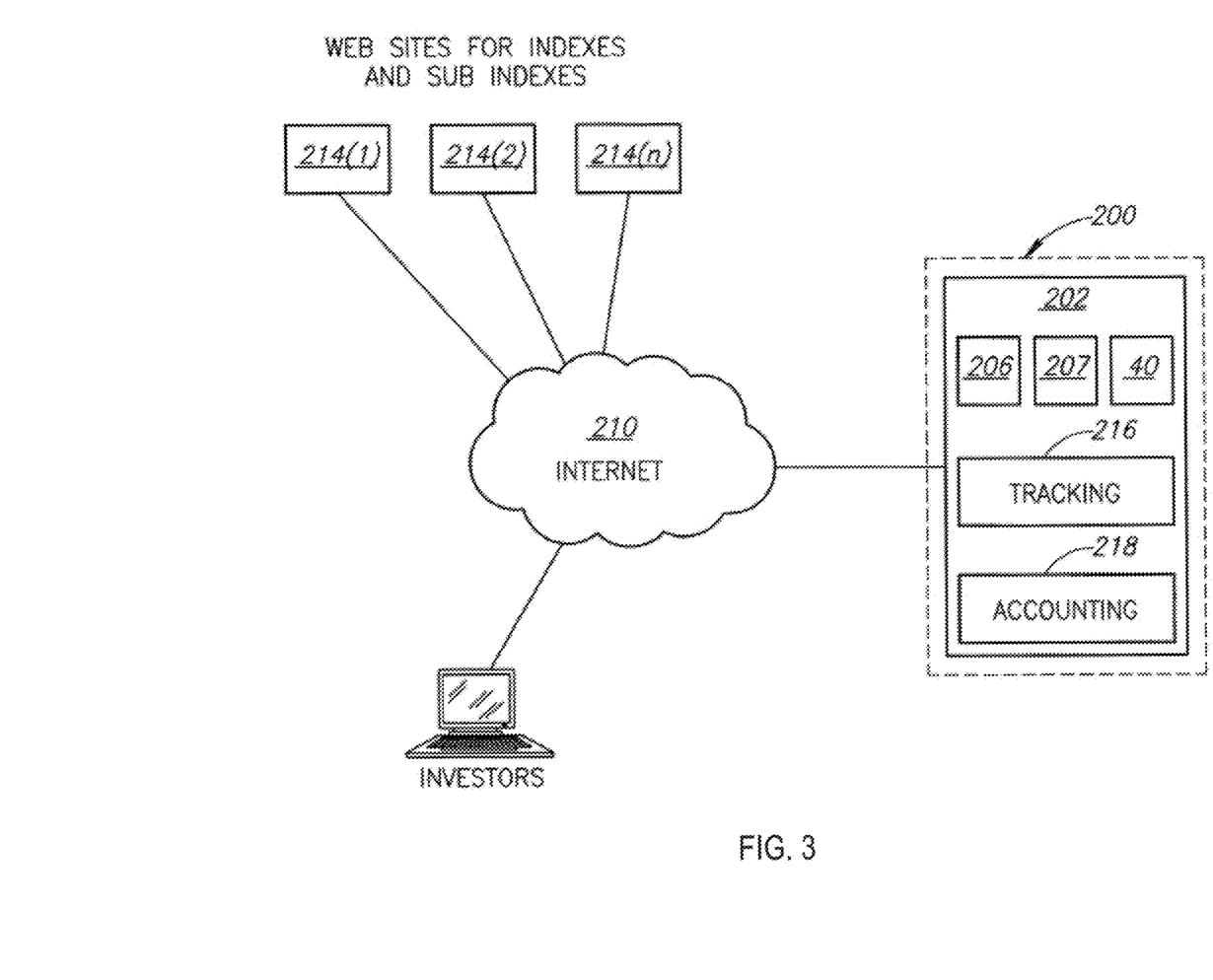
FIG. 3 is a diagram of a system on which the disclosed subject matter may be implemented.

Turning also to FIG. 3, system 10 may be implemented in part by software 40 on a home or host computer 202 that, first, tracks income with respect to CFC 12 and, second, tracks income delivered from CFC 12 to ETP 24, for example, via modules 206, 207 (inboard or outboard to the host computer). These two tiers simultaneously track commodities-based distributions while tracking dividend distribution to trust 18. CFC 12 is the only investment for trust 18. The host computer 202 is also linked to a network, such as the Internet 210, and may track the various indexes and sub indexes, for example, the GSCI® indexes via various web sites 214(1)-214(n), with a tracking module 216. Various administrative and accounting functions are provided by the accounting module 218.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

Figure 4:
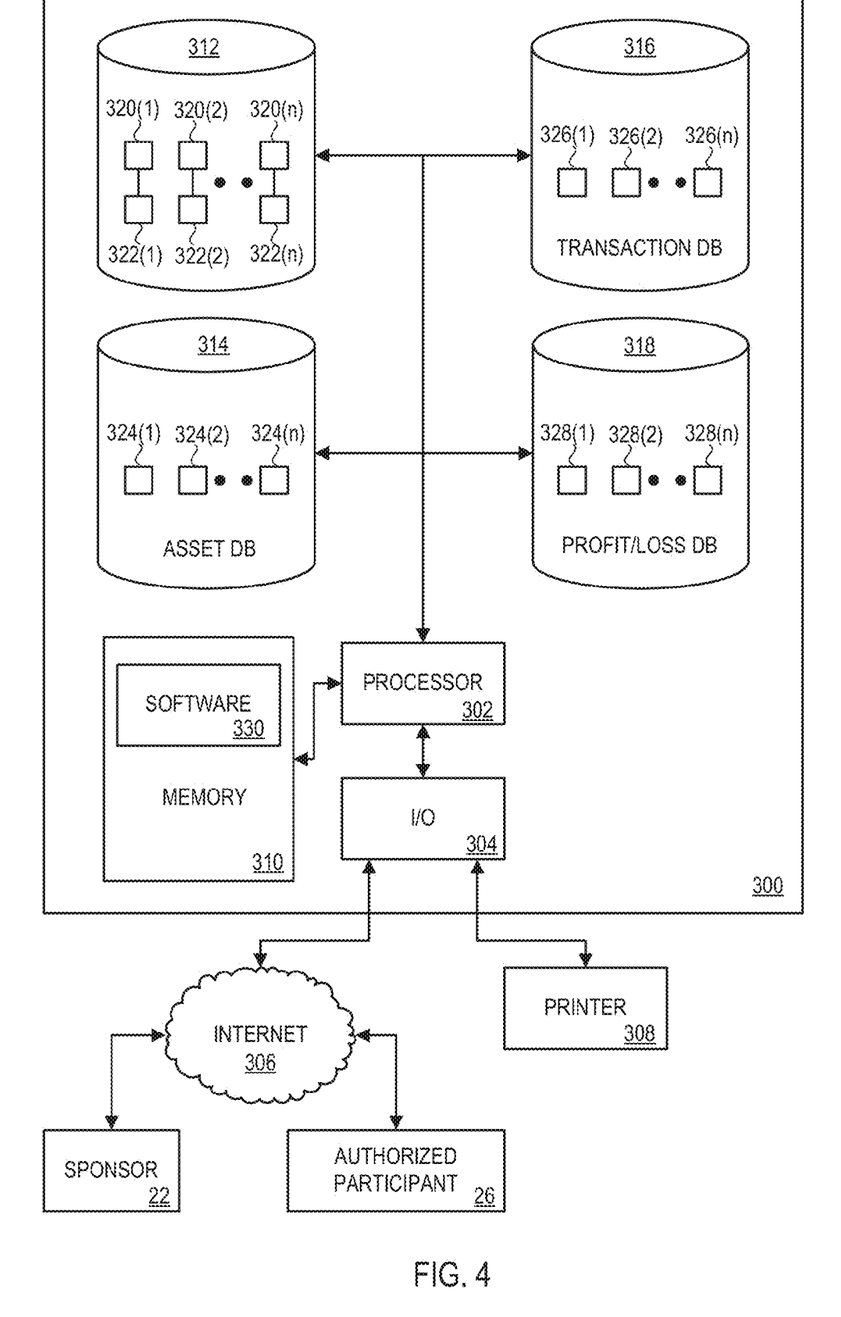
FIG. 4 is a system for managing assets of trusts owning respective controlled foreign corporations.

FIG. 4 shows a system 300, which is an embodiment of a system for managing assets of trusts owning respective CFCs. System 300 may be used to help implement system 10 (FIG. 1) by tracking the relationships between trusts (e.g., trust 18) and CFCs (e.g., CFC 12), as well as by tracking assets of each CFC. System 300 includes a processor 302 configured and arranged to execute instructions, in the form of software 330 or firmware (not shown), loaded into memory 310 from data storage (not shown) such as a hard drive, for controlling system operation. Processor 302 is, for example, a general purpose computer microprocessor or a processor custom designed for controlling system 300. As another example, processor 302 could represent multiple processors, such as in computers in a distributed computing environment.

Processor 302 is in communication with input/output (I/O) subsystem 304, which provides an interface between system 300 and one or more external systems, such as the Internet 306, and/or a printer 308. I/O system 304 includes, for example, a network interface adaptor (e.g., wired and/or wireless), and/or a universal serial bus interface.

Processor 302 is also communicatively coupled with memory 310 (e.g., volatile memory) for temporary data storage for system 300. System 300 further includes a linking database 312, an asset database 314, a transaction database 316, and an optional profit/loss database 318. Each of databases 312, 314, 316, 318 are located on a non-volatile storage media (e.g., one or more hard drives) that is communicatively coupled with processor 302. Databases 312, 314, 316, 318 may be independently or cooperatively implemented on a single computer or may be spread across multiple servers in a distributed data storage network. Although databases 312, 314, 316, and 318 are shown as separate databases, data of any two or more of these databases may be combined into a single database. Each of databases 312, 314, 316, and 318 may also represent a plurality of sub databases without departing from the scope hereof.

Linking database 312 stores associations between any one or more of trusts 320 and any one or more of CFCs 322 that are owned by that trust. In the example of FIG. 4, a CFC 322(1) is owned by a trust 320(1), and thus linking database 312 stores an association between trust 320(1) and CFC 322(1). Similarly, a CFC 322(2) is owned by a trust 320(2), and this linking database 312 stores an association between trust 320(2) and CFC 322(2), and so on. The actual number of trusts and corresponding CFCs handled by system 300 is a design choice that may vary among embodiments of system 300. Linking database 312 is populated, for example, by system 300 receiving trust and CFC information from sponsor 22, such as via Internet 306. Linking database 312 also optionally associates each trust 320 with its respective ETP (not shown in FIG. 4) defining the trust.

Asset database 314 stores information of assets 324 associated with each trust 320 and CFC 322 pair, where each CFC 322 manages the assets 324 of its respective trust 320, as discussed above. In the example of FIG. 4, asset database 314 tracks assets 324(1) of trust 320(1) and CFC 322(1), assets 324(2) of trust 320(2) and CFC 322(2), and so on. System 300 receives asset information from, for example, authorized participant 26 via Internet 306.

Transaction database 316 tracks transactions 326 associated with buying and selling assets 324. In the example of FIG. 4, transactions 326(1) represent transactions associated with assets 324(1), transactions 326(2) represent transactions associated with assets 324(2), and so on. In some embodiments of system 300, processor 302 partially or fully executes transactions (e.g., buy and selling) related to assets 324, such that assets 324 track commodity index information from received from Internet 306, for example.

System 300 optionally further includes profit/loss database 318, which tracks profit/loss data 328 associated with transactions 326 tracked by transaction database 316. In the example of FIG. 4, profit/loss data 328(1) represents the profit/loss associated with transactions 326(1), profit/loss data 328(2) represents the profit/loss associated with transactions 326(2), etc. Processor 302, for example, determines profit loss data 328 from transactions 326 tracked by transaction database 316, and/or from external data received via I/O subsystem 304. Alternately, profit/loss data 328 may be determined by an external system, and system 300 receives profit/loss data 328 from the external system via I/O subsystem 304. System 300 may transfer profit/loss data 328 to an external system, such as to a system associated with authorized participant 26, for transferring to investors for tax reporting purposes. Optionally, profit/loss data 328 is printed by printer 308.

System 300 may include functionality (not shown) to implement additional aspects of the systems and methods shown herein. For example, processor 302 may be configured and arranged to execute instructions, in the form of software or firmware, to form a CFC, to form a trust owning the CFC, and/or to form ETP defining the trust, thereby advantageously facilitating formation of system 10. Such embodiments of system 300 are, for example, configured to receive information on the formation of system 10 from sponsor 22 via Internet 306.

Figure 5:
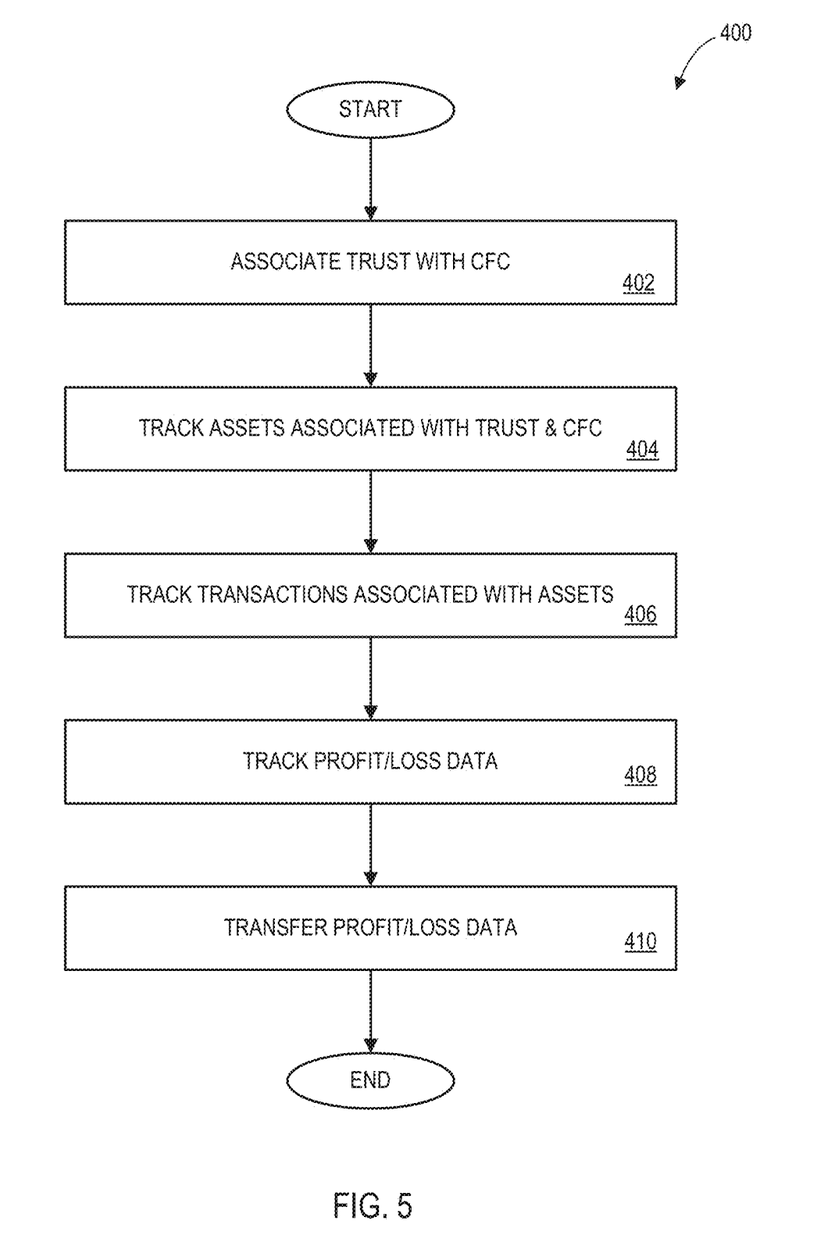
FIG. 5 is a method for managing assets of a trust owning a controlled foreign corporation.

FIG. 5 shows method 400, which is an embodiment of a method for managing assets of a trust owning a CFC. Method 400 is implemented, at least in part, by system 300, FIG. 4, for example. In step 402, method 400 associates the CFC with the trust owning the CFC. In one example of step 402, system 300 (FIG. 3) associates trust 320(1) with CFC 322(1) within linking database 312. In step 404, method 400 tracks assets associated with the CFC and the trust owning the CFC. In one example of step 404, system 300 tracks assets 324(1) associated with trust 320(1) and CFC 322(1) within asset database 314. In step 406, method 400 tracks transactions (e.g., buying and selling) associated with the assets. In one example of step 406, system 300 tracks transactions 326(1) within transaction database 316. In step 408, method 400 tracks profit/loss data associated with the transactions. In one example of step 408, processor 302 of system 300 determines profit/loss data 328(1) associated with transactions 326(1) and stores profit/loss data 328(1) within profit/loss database 318. In step 410, method 400 transfers profit/loss data to an external system. In one example of step 410, processor 302 of system 300 transfers profit/loss data 328(1) to authorized participant 26 via I/O subsystem 304 and Internet 306.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the disclosed subject matter have been described, so as to enable one of skill in the art to practice the disclosed subject matter, the preceding description is intended to be exemplary only. It should not be used to limit the scope of the disclosed subject matter, which should be determined by reference to the following claims.

What is claimed is:

1. A system for managing assets of a trust owning a controlled foreign corporation (CFC), comprising:
    a processor communicatively coupled to;
        a linking database for associating the CFC with the trust owning the CFC; and
        an asset database for tracking at least one asset associated with the CFC and the trust owning the CFC;
        a transaction database communicatively coupled to the processor for tracking transactions associated with the at least one asset;
    wherein:
        the trust is a sole owner of the CFC, and
        the processor is adapted
            for tracking the profit/loss data associated with the transactions,
            for associating the trust with an exchange traded product (ETP) defining the trust and generally tracking a commodity index that can be monitored electronically by the processor, and,
            for providing ordinary income to investors based on at least one trade on behalf of the CFC.

2. The system of claim 1, the processor adapted for transferring the profit/loss data to an external system.

3. The system of claim 1, further comprising:
    an input/output subsystem configured and arranged to interface the system with at least one external system.

4. The system of claim 3, the at least one external system comprising a system associated with an authorized participant.

5. A method for managing assets of a trust owning a controlled foreign corporation (CFC), comprising:
    associating the CFC with the trust owning the CFC using a linking database, the trust being a sole owner of the CFC;
    tracking assets associated with the CFC and the trust owning the CFC using an asset database;
    tracking transactions associated with the assets using a transaction database;
    determining profit/loss data associated with the transactions using a processor communicatively coupled with the transaction database;
    forming at least one exchange traded product (ETP) defining the trust, the at least one ETP generally tracking a commodity index that can be monitored electronically by at least one computer over a network; and
    providing ordinary income to investors based on at least one trade on behalf of the CFC.

6. An exchange traded product system, comprising:
    at least one controlled foreign corporation (CFC);
    at least one trust, each at least one trust being a sole owner of one of the at least one CFC;
    at least one exchange traded product (ETP) defining the at least one trust, the at least one ETP tracking a commodity index that can be monitored electronically by at least one computer over a network; and
    a computer configured and arranged to track: (i) at least one asset associated with the at least one CFC, (ii) at least one transaction associated with buying and selling the at least one asset, (iii) profit/loss data associated with the at least one transaction and (iv) income delivered from the at least one CFC to the at least one ETP,
    wherein trades on behalf of the CFC, within the at least one trust, result in ordinary income to investors.

7. The system of claim 6, the at least one asset of the at least one trust being managed from the at least one CFC.

8. The system of claim 6, the computer further configured and arranged to at least one commodity index, and provide ordinary income to investors based on at least one trade on behalf of the at least one CFC.

9. A non-transitory computer readable medium for managing assets of a trust owning a controlled foreign corporation (CFC), comprising:
    a processor communicatively coupled to the non-transitory computer readable medium for executing:
        instructions for associating at least one CFC with at least one trust using a linking database, each at least one CFC being owned solely by a respective one of the at least one trust;
        instructions for tracking at least one asset associated with the at least one CFC and the at least one trust owning the at least one CFC using an asset database;
        instructions for tracking at least one transaction associated with buying and selling the at least one asset using a transaction database;
        instructions for tracking profit/loss data associated with the at least one transaction using a processor communicatively coupled with the transaction database;
        instructions for forming at least one exchange traded product (ETP) defining each at least one trust, the at least one ETP generally tracking a commodity index that can be monitored electronically by at least one computer over a network;
instructions for providing ordinary income to investors based on at least one trade on behalf of the at least one CFC.

\* \* \* \* \*